United States Patent
Gharan et al.

(10) Patent No.: US 12,476,715 B2
(45) Date of Patent: Nov. 18, 2025

(54) METHOD AND SYSTEM FOR EQUALIZER CONTROL PER FREQUENCY DIVISION MULTIPLEXED (FDM) SIGNAL

(71) Applicant: CIENA CORPORATION, Hanover, MD (US)

(72) Inventors: Shahab Oveis Gharan, Ottawa (CA); Kim Byron Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 278 days.

(21) Appl. No.: 18/486,633

(22) Filed: Oct. 13, 2023

(65) Prior Publication Data

US 2025/0125882 A1   Apr. 17, 2025

(51) Int. Cl.
| | | |
|---|---|---|
| *H04B 10/00* | (2013.01) | |
| *H04B 10/69* | (2013.01) | |
| *H04J 1/02* | (2006.01) | |
| *H04J 14/00* | (2006.01) | |

(52) U.S. Cl.
CPC ............ *H04B 10/6971* (2013.01); *H04J 1/02* (2013.01)

(58) Field of Classification Search
CPC .. H04B 10/61; H04B 10/616; H04B 10/6161; H04B 10/6162; H04B 10/6163; H04B 10/6166
See application file for complete search history.

(56) References Cited

U.S. PATENT DOCUMENTS

| | | |
|---|---|---|
| 7,555,227 B2 | 6/2009 | Bontu et al. |
| 7,701,842 B2 | 4/2010 | Roberts et al. |
| 7,899,340 B1 | 3/2011 | Bontu et al. |
| 8,385,747 B2 | 2/2013 | Roberts et al. |
| 11,126,219 B2 | 9/2021 | Oveis Gharan et al. |
| 11,239,929 B1 | 2/2022 | Babaee et al. |
| 2011/0222854 A1 | 9/2011 | Roberts et al. |
| 2015/0280853 A1* | 10/2015 | Sun .................... H04B 10/6162 398/81 |

OTHER PUBLICATIONS

Kudo et al., Coherent Optical Single Carrier Transmission Using Overlap Frequency Domain Equalization for Long-Haul Optical Systems, Aug. 15, 2009, Journal of Lightwave Technology, vol. 27, No. 16, pp. 3721-3728 (Year: 2009).*

(Continued)

*Primary Examiner* — Daniel G Dobson
(74) *Attorney, Agent, or Firm* — Guntin & Gust, PLC; Mark Wilinski (57) ABSTRACT

Aspects of the subject disclosure may include, for example, receiving, at a coherent optical receiver system, Frequency Division Multiplexed (FDM) signals within a spectrum, and equalizing the FDM signals, wherein the equalizing involves creating a plurality of sub-spectra that each corresponds to a respective one of the FDM signals, wherein two sub-spectra of the plurality of sub-spectra have overlapping frequencies, and applying a distinct equalization to each of the plurality of sub-spectra, resulting in distinct equalizations, wherein at least two of the distinct equalizations have substantially independent control. Other embodiments are disclosed.

20 Claims, 7 Drawing Sheets

(56) References Cited

OTHER PUBLICATIONS

Duthel, Thomas, et al., "DSP Design for Point-to-Multipoint Transmission", OFC 2023, Optica Publishing Group Mar. 2023, 3 pp.
International Search Report & Written Opinion for PCT/US2024/050649, mailed Jan. 20, 2025, 6 pp.
Baeuerle, Benedikt, "Low-Complexity Real-Time Receiver for Coherent Nyquist-FDM Signals", Journal of Lightwave Technology, IEEE, USA, vol. 36, No. 24, Dec. 15, 2018 (Dec. 15, 2018), pp. 5728-5737.
Kudo, et al., "Coherent Optical Single Carrier Transmission Using Overlap Frequency Domain Equalization for Long-Haul Optical Systems", Journal of Lightwave Technology, IEEE, USA, vol. 27, No. 16, Aug. 15, 2009 (Aug. 15, 2009), pp. 3721-3728.

\* cited by examiner

METHOD AND SYSTEM FOR EQUALIZER CONTROL PER FREQUENCY DIVISION MULTIPLEXED (FDM) SIGNAL

FIELD OF THE DISCLOSURE

The subject disclosure relates to equalizer control per frequency division multiplexed (FDM) signal.

BACKGROUND

In coherent optical communications, a receiver that receives an optical signal with modulated data may mix the signal with a strong, narrow-line-width, local oscillator signal by way of an optical hybrid, where the combined signal may then be made incident on one or more photodetectors. In certain implementations, the received optical signal may first be split into orthogonal polarizations that are then processed by a respective optical hybrid. In-phase and quadrature components of each polarization may be detected using respective photodetectors that are positioned to receive corresponding signals output by the optical hybrid. In any case, the frequency spectrum of the electrical current outputs of the photodetector(s) is substantially proportional to the convolution of the received optical signal and the local oscillator, and contains a signal component lying at an intermediate frequency (abbreviated IF or as an algebraic symbol $f_{IF}$) that "contains" the data. This data component can be isolated and detected by way of electronic filtering and processing of the photodetector outputs.

BRIEF DESCRIPTION OF THE DRAWINGS

Reference will now be made to the accompanying drawings, which are not necessarily drawn to scale, and wherein.

DETAILED DESCRIPTION

Figure 1:
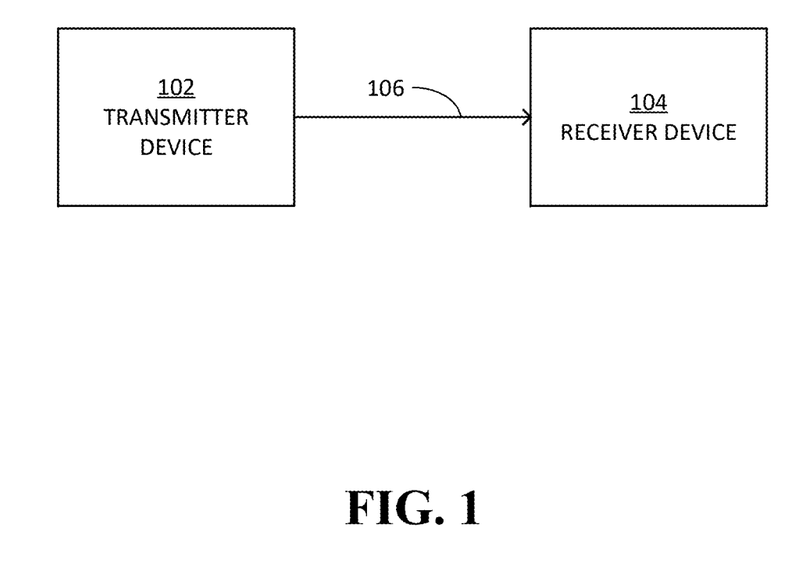
FIG. 1 is a diagram of a non-limiting example of a communication network in accordance with various aspects described herein.

FIG. 1 is a diagram of a non-limiting example of a communication network 100 in accordance with various aspects described herein. The communication network 100 may include at least one transmitter device 102 and at least one receiver device 104. The transmitter device 102 may be capable of transmitting signals over a communication channel, such as a communication channel 106. The receiver device 104 may be capable of receiving signals over a communication channel, such as the communication channel 106. In various embodiments, the transmitter device 102 may also be capable of receiving signals and/or the receiver device 104 may also be capable of transmitting signals. Thus, one or both of the transmitter device 102 and the receiver device 104 may be capable of acting as a transceiver.

The communication network 100 may include additional elements not shown in FIG. 1. For example, the communication network 100 may include one or more additional transmitter devices, one or more additional receiver devices, and one or more other devices or elements involved in the communication of signals in the communication network 100.

In some embodiments, the signals that are transmitted and received in the communication network 100 may include optical signals and/or electrical signals. For example, the transmitter device 102 may be a first optical transceiver, the receiver device 104 may be a second optical transceiver, and the communication channel 106 may be an optical communication channel. In certain embodiments, one or both of the first optical transceiver and the second optical transceiver may be a coherent modem.

In various embodiments, each optical communication channel in the communication network 100 may include one or more links, where each link may include one or more spans, and where each span may include a length of optical fiber and one or more optical amplifiers. Where the communication network 100 involves the transmission of optical signals, the communication network 100 may include additional optical elements not shown in FIG. 1, such as wavelength selective switches, optical multiplexers, optical de-multiplexers, optical filters, and/or the like.

Various elements and effects in an optical link between two communicating devices may result in the degradation of transmitted signals. That is, optical signals received over optical links can become distorted. Particularly, these signals may suffer from polarization mode dispersion (PMD), polarization dependent loss or gain (PDL or PDG), state of polarization (SOP) rotation, amplified spontaneous emission (ASE) noise, wavelength-dependent dispersion or chromatic dispersion (CD), nonlinear noise from propagation through fiber, and/or other effects. For instance, polarization effects of a fiber link tend to rotate the transmitted polarizations such that, at the receiver, they are neither orthogonal to each other nor aligned with the polarization beam splitter of the optical hybrid. As a result, each of the received polarizations (e.g., downstream of the polarization beam splitter) may contain energy from both of the transmitted polarizations, as well as distortions due to CD, PMD, PDL, etc. These problems may be compounded for polarization-division multiplexed signals in which each transmitted polarization contains a respective data signal. The degree of signal degradation due to noise and nonlinearity may be characterized by a signal-to-noise ratio (SNR) or, alternatively, by a noise-to-signal ratio (NSR). The signals transmitted in the communications network may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

Figure 2A:
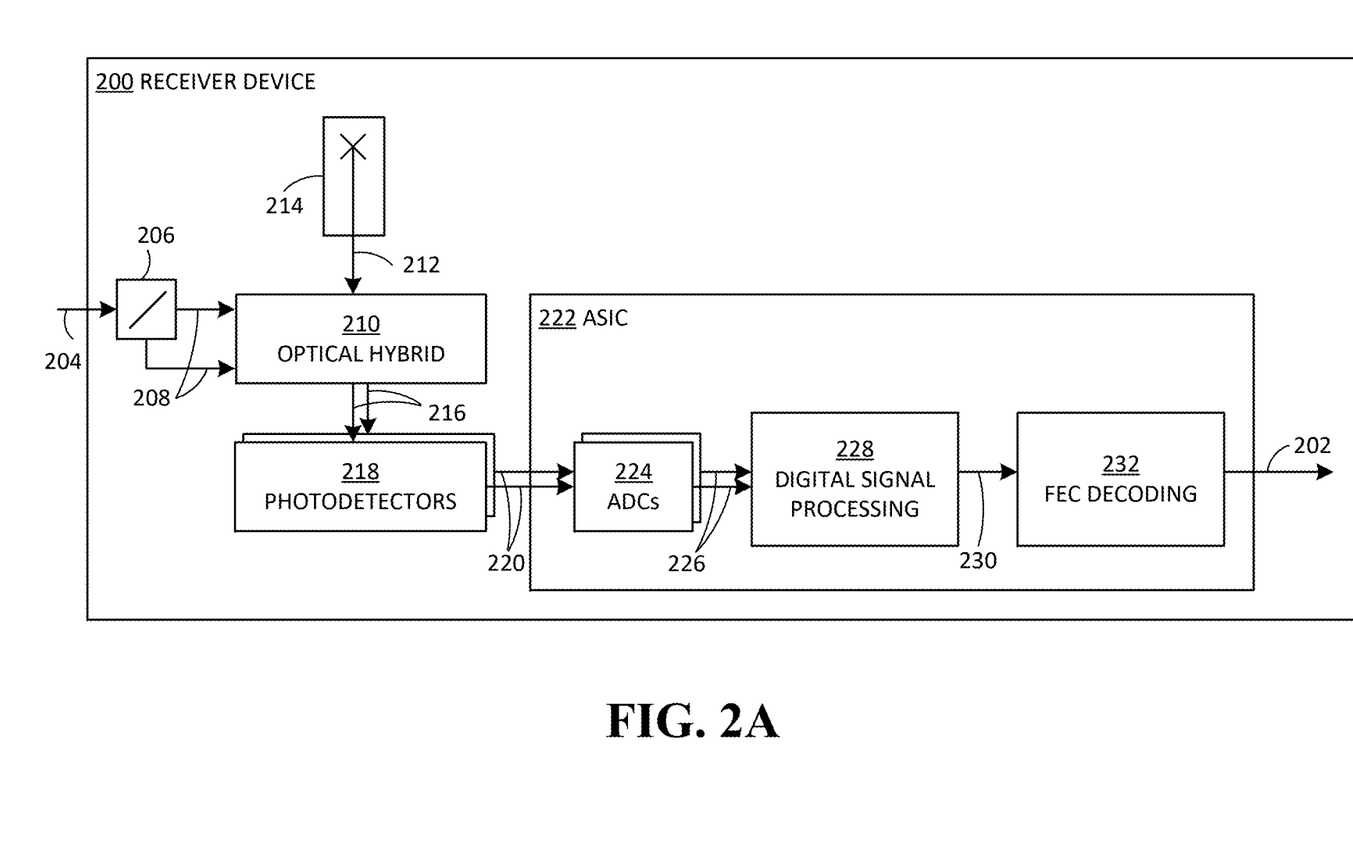
FIG. 2A illustrates an example receiver device in accordance with various aspects described herein.

FIG. 2A illustrates an example receiver device 200 in accordance with various aspects described herein. In various embodiments, the receiver device 200 may be the same as or similar to (or otherwise correspond to) the receiver 104 of FIG. 1, and may be configured to receive an optical signal 204, which may comprise a degraded version of an optical signal generated by a transmitter device (e.g., the transmitter device 102 of FIG. 1). The optical signal generated by the transmitter device may be representative of information bits (also referred to as client bits) which are to be communicated to the receiver device 200. The optical signal generated by the transmitter device may be representative of a stream of symbols. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques, such as frequency division multiplexing (FDM), polarization-division multiplexing (PDM), single polarization modulation, modulation of an unpolarized carrier, mode-division multiplexing, spatial-division multiplexing, Stokes-space modulation, polarization balanced modulation, wavelength division multiplexing (WDM) (where a plurality of data streams is transmitted in parallel, over a respective plurality of carriers, and where each carrier is generated by a different laser), and/or the like.

The receiver device 200 may be configured to recover corrected client bits 202 from the received optical signal 204. The receiver device 200 may include a polarizing beam splitter 206 configured to split the received optical signal 204 into polarized components 208. According to one example implementation, the polarized components 208 may include orthogonally polarized components corresponding to an X-polarization and a Y-polarization. An optical hybrid 210 may be configured to process the components 208 with respect to an optical signal 212 produced by a laser 214, thereby resulting in optical signals 216. Photodetectors 218 may be configured to convert the optical signals 216 output by the optical hybrid 210 to analog electrical signals 220. The frequency difference between the Rx laser and the Tx laser is the Intermediate Frequency, and an offset of that away from nominal can be called $f_{IF}$. (The nominal difference is usually zero.) According to one example implementation, the analog electrical signals 220 may include four signals corresponding, respectively, to the dimensions XI, XQ, YI, and YQ, where XI and XQ denote the in-phase and quadrature components of the X-polarization, and YI and YQ denote the in-phase and quadrature components of the Y-polarization. Together, elements such as the beam splitter 206, the laser 214, the optical hybrid 210, and the photodetectors 218 may form a communication interface configured to receive optical signals from other devices in a communication network.

As shown in FIG. 2A, the receiver device 200 may include an application specific integrated circuit (ASIC) 222. The ASIC 222 may include analog-to-digital converters (ADCs) 224 that are configured to sample the analog electrical signals 220 and generate respective digital signals 226. In certain alternate embodiments, the ADCs 224 or portions thereof may be separate from the ASIC 222. The ADCs 224 may sample the analog electrical signals 220 periodically at a sample rate that is based on a signal received from a voltage-controlled oscillator (VCO) at the receiver device 200 (not shown). The ASIC 222 may be configured to apply digital signal processing to the digital signals 226 using a digital signal processing system 228. The digital signal processing system 228 may be configured to perform equalization processing that is designed to compensate for a variety of channel impairments, such as CD, SOP rotation, mean PMD that determines the probability distribution which instantiates as differential group delay (DGD), PDL or PDG, and/or other effects. The digital signal processing system 228 may further be configured to perform carrier recovery processing, which may include calculating an estimate of carrier frequency offset $f_{IF}$ (i.e., the difference between the frequency of the transmitter laser and the frequency of the receiver laser 214). According to some example implementations, the digital signal processing system 228 may further be configured to perform operations such as multiple-input-multiple-output (MIMO) filtering, clock recovery, and FDM subcarrier de-multiplexing. The digital signal processing system 228 may also be configured to perform symbol-to-bit demapping (or decoding) using a decision circuit, such that signals 230 output by the digital signal processing system 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some example implementations, the equalization processing implemented as part of the digital signal processing system 228 may include one or more equalizers, some or all of which may be configured to compensate for impairments in the channel response. In general, an equalizer applies a substantially linear filter to an input signal to generate an output signal that is less degraded than the input signal. The filter may be characterized by compensation coefficients which may be incrementally updated from time to time (e.g., every so many clock cycles or every so many seconds) with the goal of reducing the degradation observed in the output signal.

According to some example implementations, the equalization processing of the digital signal processing system 228 may include an equalizer filter (referred to herein as a "C filter") that is designed to apply a dispersive function to at least partially compensate for slowly changing channel impairments, such as CD. The C filter may be configured as a quasi-static dispersion-compensating filter and/or a spectral-shaping filter (i.e., that provides basic matched filter shaping). As an example, compensation coefficients for the C filter may be calculated through firmware using the estimated CD during start-up of the receiver device (also referred to as the acquisition stage), and those coefficients may be applied to received signals (either by convolution in the time domain or by multiplication in the frequency domain), thereby resulting in processed signals which are, at least partially, compensated for CD. The C filter may be referred to as static or quasi-static because the updating of its compensation coefficients is relatively infrequent. For instance, the coefficients may be updated periodically (e.g., once every second) based on information obtained downstream during the digital signal processing. The slow rate of change of the compensation coefficients means that the static (or quasi-static) equalizer filter may only be capable of tracking and compensating for relatively slow changes in the channel response, and not fast changes. For example, the static (or quasi-static) equalizer filter may be able to compensate for changes in CD, which are typically at a rate on the order of <1 Hz, but the static (or quasi-static) equalizer filter may be unable to compensate for changes in SOP rotation, which typically happen much more quickly.

According to some example implementations, the equalization processing of the digital signal processing system 228 may include an additional equalizer filter (referred to herein as an "H filter") which uses feedback to compensate for relatively fast changes in the channel response, such as SOP changes, PMD changes, PDL changes, small amounts of CD, and/or analog characteristics of the transmitter and receiver, which may change at a rate on the order of kHz. For example, the feedback equalizer H filter may compensate for impairments varying at a rate of approximately 100 kHz. In various embodiments, feedback equalization of the H filter may rely on a Least Mean Squares (LMS) feedback loop or adaptive Wiener filtering using a constant modulus algorithm (CMA), an affine projection algorithm (APA), or a recursive least squares (RLS) algorithm. For instance, feedback equalization may leverage frequency-domain RLS equalization. In various embodiments, feedback equalization may additionally, or alternatively, be implemented using blocks in the time domain.

In one or more embodiments, the tracking response of the H filter may be more than ten times faster than that of the C filter. For instance, one or more aspects of the optical coherent receiver described in U.S. Pat. No. 7,555,227 (which issued on Jun. 30, 2009 and is incorporated herein by reference in its entirety) may be employed in one or more systems/receivers described herein. For instance, one or more aspects of the equalization described in U.S. Pat. No. 7,555,227, which is separated into a C filter and an H filter, may be utilized in the receiver 200 of FIG. 2A herein.

If the number of Fast Fourier Transform (FFT) bins, N, for the H filter is, for example, 1024, the H filter can contain coefficients comprising 1024 2×2 complex-valued matrices. This example comprises 8096 real values. When each of these coefficients is tracking the impairments of the signal at hundreds of kHz or MHz, there is insufficient time for noise filtering (e.g., averaging) in the values of the coefficients. 8096 noisy coefficients can significantly degrade the quality of the signal being filtered and thus degrade the performance of the system.

In exemplary embodiments, the H filter of the digital signal processing system 228 may be configured with a system that reduces filter coefficient noise. In some embodiments, the H filter may be configured with a "supercharger" that suppresses the portions of an update outside of a time domain window that is significantly narrower than the time duration of the full equalizer. For instance, in one or more embodiments, one or more aspects of the equalizer described in U.S. Pat. No. 8,385,747 (which issued on Feb. 26, 2013 and is incorporated herein by reference in its entirety) may be employed in one or more systems/receivers described herein. As an example, one or more aspects of the supercharger 84 described in U.S. Pat. No. 8,385,747 may be utilized in or leveraged by the H filter of the receiver 200 of FIG. 2A herein. One purpose of the aforementioned suppression may be to allow fast tracking of polarization effects, with, for example, the aforementioned 8096 coefficients, while not suffering from the degradation which would occur if the full time duration is tracked at that speed. For example, in a system with 1024 FFT bins in the frequency domain, the time domain window might be 33 samples long. Here, if a rectangular window is used, this reduces the noise energy in each of the 8096 real frequency domain coefficients by a factor of 1024/33. Time domain equalization methods are generally limited to a relatively short time domain interval, which might also be about 33 due to implementation gate count and coefficient noise.

In certain embodiments where the supercharger '84' of U.S. Pat. No. 8,385,747 is employed in the receiver 200 described herein, the supercharger may perform dynamic tracking at response rates of, for instance, hundreds of kHz or even some low MHz. There may be, for instance, thousands of (e.g., 8096) real coefficients in the frequency domain for such speeds. In various embodiments, the supercharger may dramatically reduce the dimensionality of what's being tracked, which can provide massive noise filtering on those coefficients. What is being tracked at high speed generally has a much smaller number of dimensions—e.g., 33 out of 1000, which equates to 33 consecutive time domain samples, whose correspondence in the frequency domain is a broad smoothing of the characteristic. As a specific example, a multiplication by a rectangular time window produces the corresponding SINC convolution in the frequency domain, which smooths the frequency response. This means that the part that gets tracked at high speed has smooth characteristics in the frequency domain, which can also be referred to as low finesse.

Notwithstanding, other characteristics of a received signal in the frequency domain may have sharp or vertical edges (e.g., a rectangular shaped signal). More particularly, in exemplary embodiments, the optical signal transmitted by a transmitter device may be generated using FDM. FDM involves digitally dividing up the modulated optical spectrum into a plurality of subcarriers, each with a different center frequency, and using each subcarrier to transmit a signal that is representative of a respective stream of symbols. In this manner, a plurality of symbol streams may be simultaneously communicated, in parallel, over the optical communication channel. In the Rx digital signal processing (DSP) system, the location in frequency of these subcarriers is a function of $f_{IF}$. A typical FDM implementation involves sufficiently separating the frequencies of the subcarriers such that the spectral regions that may contain the subcarrier energy do not significantly overlap as a function of the anticipated range of $f_{IF}$. Each subcarrier would then correspond to a different FDM sub-band, also referred to as an FDM channel.

It is desirable to pack FDM (and/or WDM) signals very close to each other, such that, for instance, roll-off factor ρ=0.000 with no guard bands, while not suffering from distortion due to neighboring FDM/WDM signal cross-talk. This helps to improve system spectral efficiency. However, non-zero $f_{IF}$ at a coherent optical receiver can result in such distortion. More particularly, while a transmitting laser in the transmitter and the local oscillator laser in the receiver might nominally be the same, their exact frequencies are continuously changing during operations due to dithering effects, microphonics, power supply interference, temperature, etc. This results in a non-zero frequency difference between the two lasers—i.e., a non-zero $f_{IF}$.

When the IF shifts, which it continuously does over time (i.e., the value of IF keeps shifting back and forth about zero (0) IF), the above-described sharp/vertical edges of FDMs may also shift as well. In a situation where the FDMs are not separated by any guard bands (e.g., zero guard bands) or are separated by very small guard bands (e.g., guard bands that have less than the peak-to-peak variation in IF, such as guard bands that are less than about 2 GHz in size), a non-zero IF can result in the (e.g., entire) spectrum of the FDM signal being shifted in frequency one way or the other. From the perspective of any given FDM, this frequency shifting due to non-zero IF results in a shift or expansion of energy from neighboring FDMs. Static processing/filtering at "ideal" edges of the FDM can thus result in data loss since a portion of its energy has shifted to higher or lower frequencies.

The above-described supercharger may not necessarily be capable of tracking the fine resolution, sharp/vertical edge of a given FDM due to the smoothness of the high speed response. For instance, while LMS might be able to track sharp/vertical edges (fine granularity) at a much slower response, there is room for improvement. Fine granularity in the frequency domain generally has to be slow in order for time averaging (or equivalently, filtering) to reduce the total noise of (e.g., all of) the coefficients. Also, fine frequency finesse inevitably implies long impulse responses. The supercharger operation in the H filter can result in adjustments of terms with equivalently fine frequency finesse in the H filter that is much slower than those terms with a short impulse response, if those fine terms are adjustable at all.

In exemplary embodiments, the equalization processing of the digital signal processing system 228 may include yet another layer of equalizer filtering (referred to herein as an "X filter") that introduces "fine granularity" in the frequency domain as well as provides high frequency tracking of signal (e.g., FDM signal) edges. Various embodiments of the X filter are described in co-pending U.S. patent application Ser. No. 18/193,322 filed on Mar. 30, 2023 (which is incorporated herein by reference in its entirety).

Methods and techniques relating to sampling, supercharger implementation, clock phase detection, and laser frequency control are variously described in U.S. Pat. No. 7,701,842 (which issued on Apr. 20, 2010), U.S. Pat. No. 11,239,929 (which issued on Feb. 1, 2022), U.S. Pat. No. 11,126,219 (which issued on Sep. 21, 2021), and U.S. Pat. No. 7,899,340 (which issued on Mar. 1, 2011), each of which is incorporated herein by reference in its entirety. U.S. Pat. No. 7,701,842 describes sampling of a received digital signal at a rate of N, where 1<N<2, and illustrates a transmitted spectrum with a root raised cosine shape. U.S. Pat. No. 11,239,929 describes methods for increasing the stable tracking speed of an H-filter equalizer with an approximation to RLS. Element 334 therein performs time-domain windowing for the supercharger. U.S. Pat. No. 11,126,219 describes frequency division multiplexing as well as a clock phase detection technique using interior spectral components. FIG. 4 therein shows a transmitted spectrum having a root raised cosine shape with roll-off factors of $\rho=0.14$ and $\rho=0.30$. This document describes why it is desirable to reduce rho ($\rho$) towards zero, and packing WDM and/or FDM signals adjacent to each other. The document also describes a matched-filter equalizer in the receiver (with $\rho=0.000$) having an impulse response that is a sinc function, which has a very long time duration. U.S. Pat. No. 7,899,340 describes methods for controlling the frequencies of the lasers in the transmitter and receiver of a coherent optical digital transmission system.

Figure 2B:
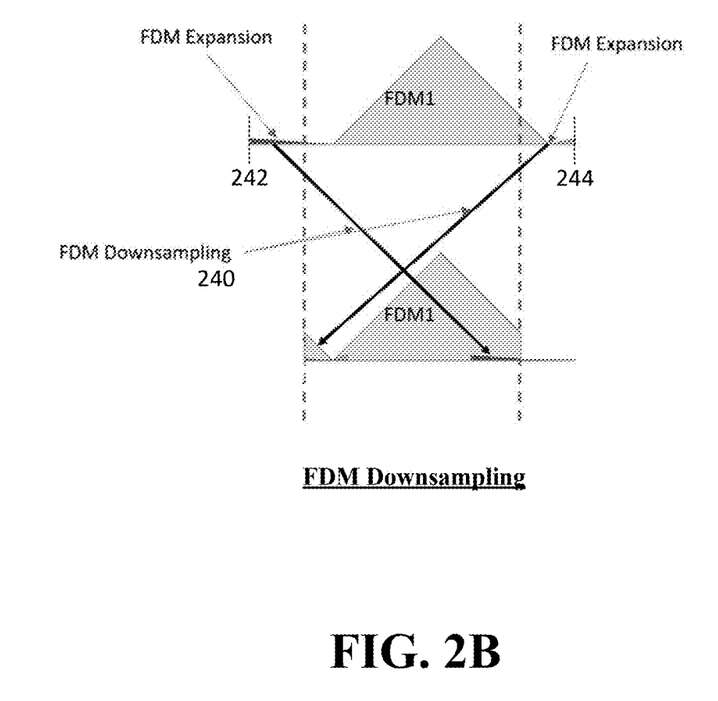
FIG. 2B illustrates how FDM downsampling at an optical receiver affects an FDM signal in the frequency domain for a non-zero fir, in accordance with various aspects described herein.

FIG. 2B illustrates how FDM downsampling at an optical receiver affects an FDM signal in the frequency domain for a non-zero fir, in accordance with various aspects described herein. While the diagram of FIG. 2B shows a classical triangular shape for the FDM signal(s), this is for purposes of illustration only. It will be understood and appreciated that the actual shape of the FDM signal received at an optical receiver may be rectangular or the like with sharp/vertical edges, as described above. In exemplary embodiments, the FDM downsampling is performed using an expansion function. Per the Nyquist sampling theorem, sampling a signal at the Baud rate results in periodic spectrum in the frequency domain—that is, the spectrum repeats. For instance, if the Baud rate is 200 GBaud, the spectrum repeats every 200 GHz. This repetition would be infinite if there is infinite bandwidth in analog. However, because the actual analog bandwidth is limited, repetitions are cut off at some point.

The FDM downsampling arrows 240 in FIG. 2B show the operation of the expansion function in which repeated energy is extracted, shifted by the Baud rate, and added. Up to the vertical edges 242, 244 is the extent of spectrum that is made available to the expansion function. In other words, FDM downsampling adds to the highest bins of the FDM, those bins that are the FDM baud rate lower in frequency, and adds to the lowest bins of the FDM, those bins that are the FDM baud rate higher in frequency. The result of the downsampling is the frequency domain version of what, in the time domain, are symbol-spaced samples of one FDM signal. The width of one down-sampling expansion region is, ideally, $(N-1)/2$ times the Baud rate of that FDM signal, where the sampling ratio N is generally such that $1<N<2$. Of course, in implementation, the width of such a down-sampling region may be equal to such an ideal width, may be approximately equal to such an ideal width (such as within a threshold difference from the ideal width), or may be substantially less than the ideal width (such as greater than a threshold difference from the ideal width). It should be noted that the information in an expansion region can be used twice—i.e., once in the FDM (e.g., FDM 1) and once in a neighboring FDM.

Figure 2C:
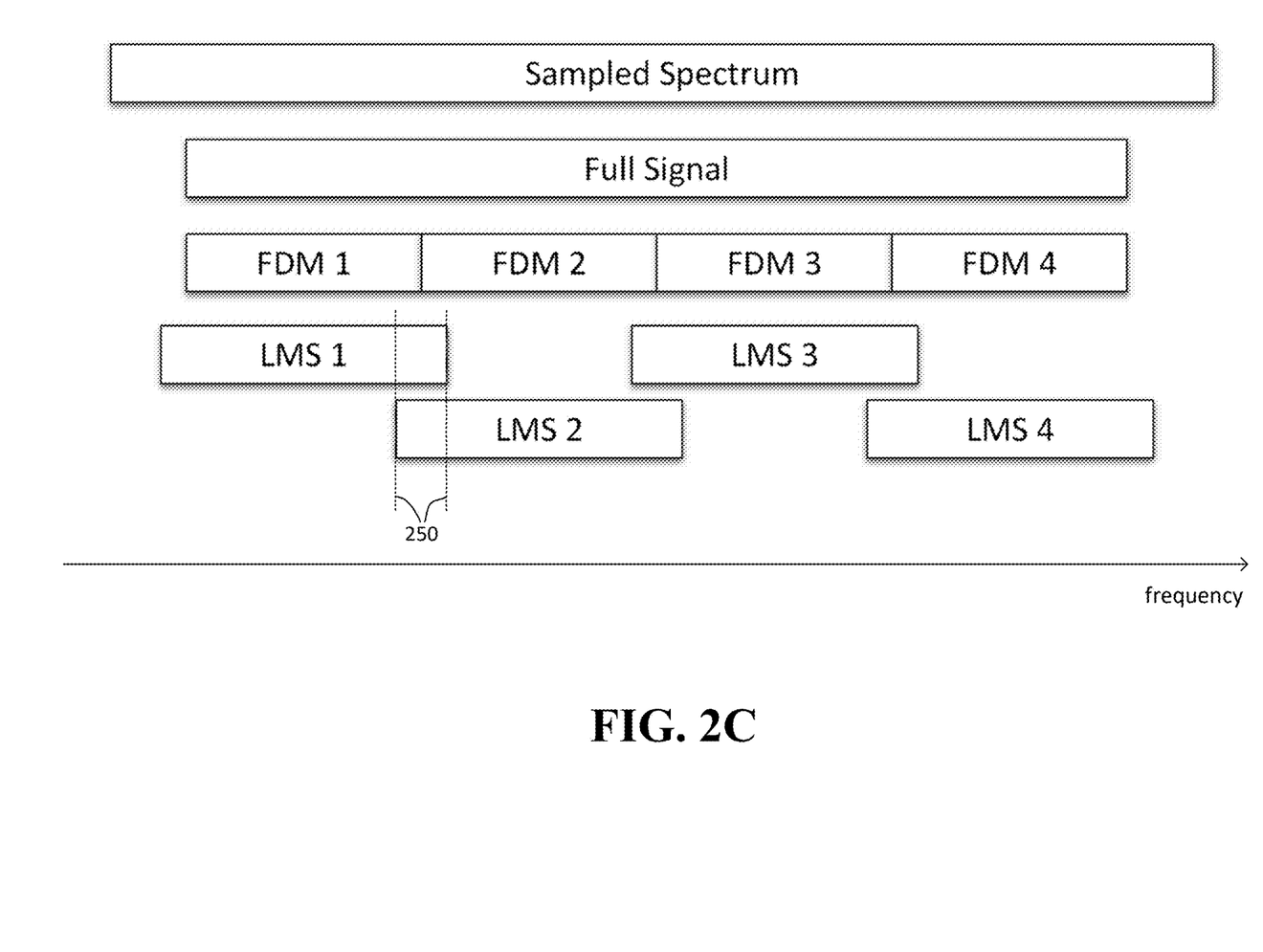
FIG. 2C illustrates the separation of the frequencies associated with each FDM signal into overlapping regions and how separate filtering can be applied to each such region, in accordance with various aspects described herein.
Figure 2D:
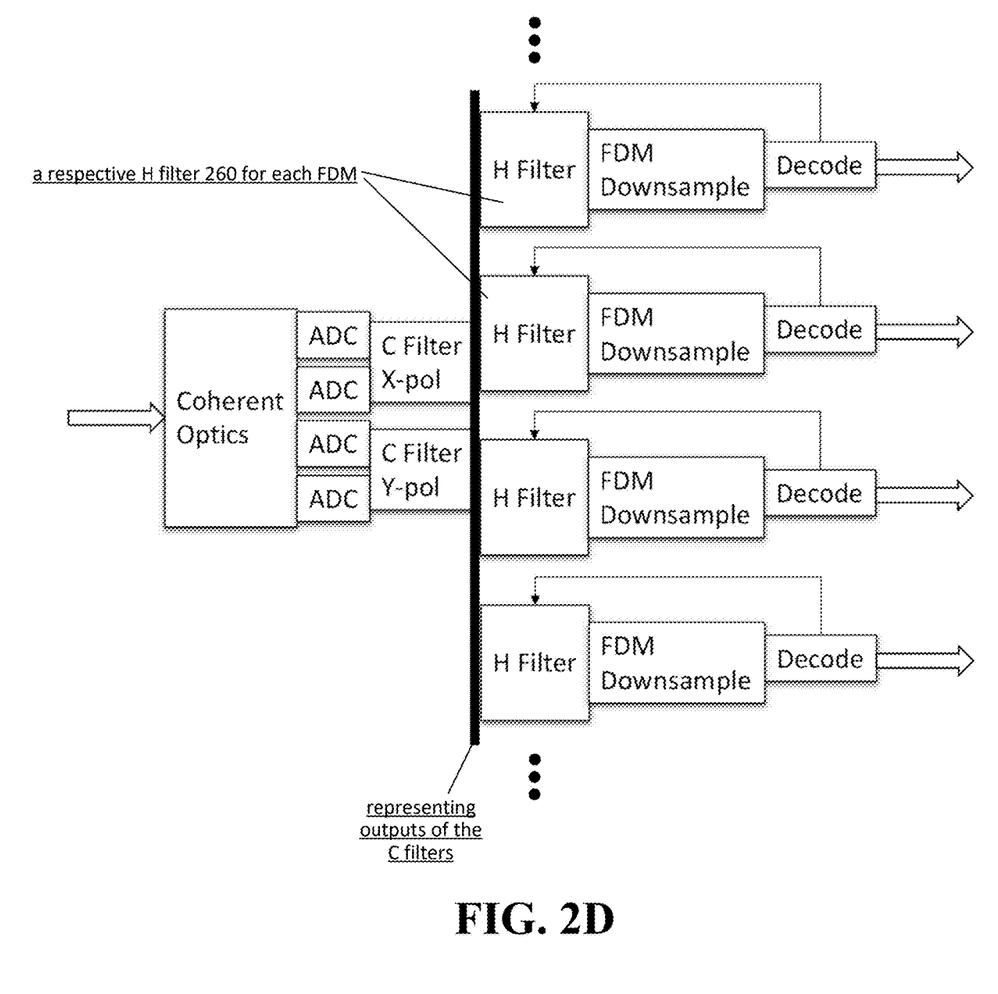
FIG. 2D illustrates an example, non-limiting embodiment of a coherent optical receiver with independent equalizers for the FDM signals, in accordance with various aspects described herein.

In exemplary embodiments, a coherent optical receiver may be configured to perform equalization of closely-spaced FDM signals. In one or more embodiments, the information in at least a portion of each expansion region of each neighboring FDM may be equalized twice (i.e., separately equalized). This can be achieved by identifying or creating an expanded frequency region for each FDM stream such that the regions defined for neighboring FDMs overlap with one another, and applying a respective instance of the above-described H filter to each such region. FIG. 2C illustrates the separation of the frequencies associated with each FDM signal into overlapping regions and how separate filtering can be applied to each such region, in accordance with various aspects described herein. FIG. 2D illustrates an example, non-limiting embodiment of a coherent optical receiver with independent H filters 260 for the FDM signals, in accordance with various aspects described herein. In exemplary embodiments, the coherent optical receiver of FIG. 2D may be similar to, or otherwise correspond to, the receiver 200 described above with respect to FIG. 2A.

Exemplary embodiments of the equalization method described herein advantageously implement a respective supercharger function (or the like) for each FDM. This prevents supercharger effects relating to processing of one FDM from affecting neighboring FDMs, which might otherwise occur if a conventional H filter with a single supercharger is used. To illustrate this benefit, assume that non-zero IF has caused all of the FDMs to shift down in frequency. Referring to FIG. 2C, this shifting may result in LMS 1 attenuating the signal energy in overlapping region 250 (since there is less signal energy there for FDM 1) and LMS 2 amplifying the signal energy in the overlapping region 250 (since there is more signal energy there for FDM 2). If a single supercharger is used in the equalization of all of the FDMs, it may smooth out or average the opposite actions of LMS 1 and LMS 2, resulting in supercharge leakage effects. That is, the coefficient noise filtering by the supercharger for one or more FDMs may undesirably impact the coefficient noise filtering for one or more other FDMs. Thus, by having a separate supercharger function for each H filter 260, such undesired supercharger leakage can be prevented. In any case, exemplary embodiments of the H filtering reduce or eliminate a performance penalty that the system might otherwise suffer due to poor or imperfect equalization of FDM signals. Separate and independent equalization of the expansion regions of neighboring FDMs also allows for different roll-off factors, different dispersion, and/or different delay across FDM subcarriers.

As shown in FIG. 2C, a full signal may be within a sampled spectrum and be composed of, for instance, four FDM streams with minimal to no gap between them. It will be understood and appreciated that, while four FDM streams are used in this example here, there may be more or fewer FDM streams. LMS regions may each span or cover not only a base spectrum that one FDM occupies when the IF=0, but also additional spectrum to accommodate for non-zero IF as well as down-sampling of expansion regions. Accordingly, adjacent LMS regions may overlap (see, e.g., overlapping portion 250). The signal in each LMS region may then be passed to a separate LMS equalizer (i.e., LMS 1, LMS 2, LMS 3, LMS 4). For overlapping portion 250, LMS 1 may equalize down (i.e., attenuate) the signal in a situation where there is insignificant FDM 1 signal energy in those frequencies, whereas LMS 2 may equalize up (i.e., amplify) the signal. Thus, for non-zero IF, exemplary embodiments of H filtering shown in FIG. 2C can respond quickly (albeit not as quickly as the aforementioned X filter) to provide the best equalization despite unstable IF.

In exemplary embodiments, a respective H filter 260 may be associated with each FFT bin (i.e., corresponding to one of the LMS regions), such that there are separate H filters 260 for the various FDMs across the vector. This is in stark contrast to conventional filtering where a single filter is applied across all FFT bins (or across a central portion of the entire set of FFT bins).

Figure 2E:
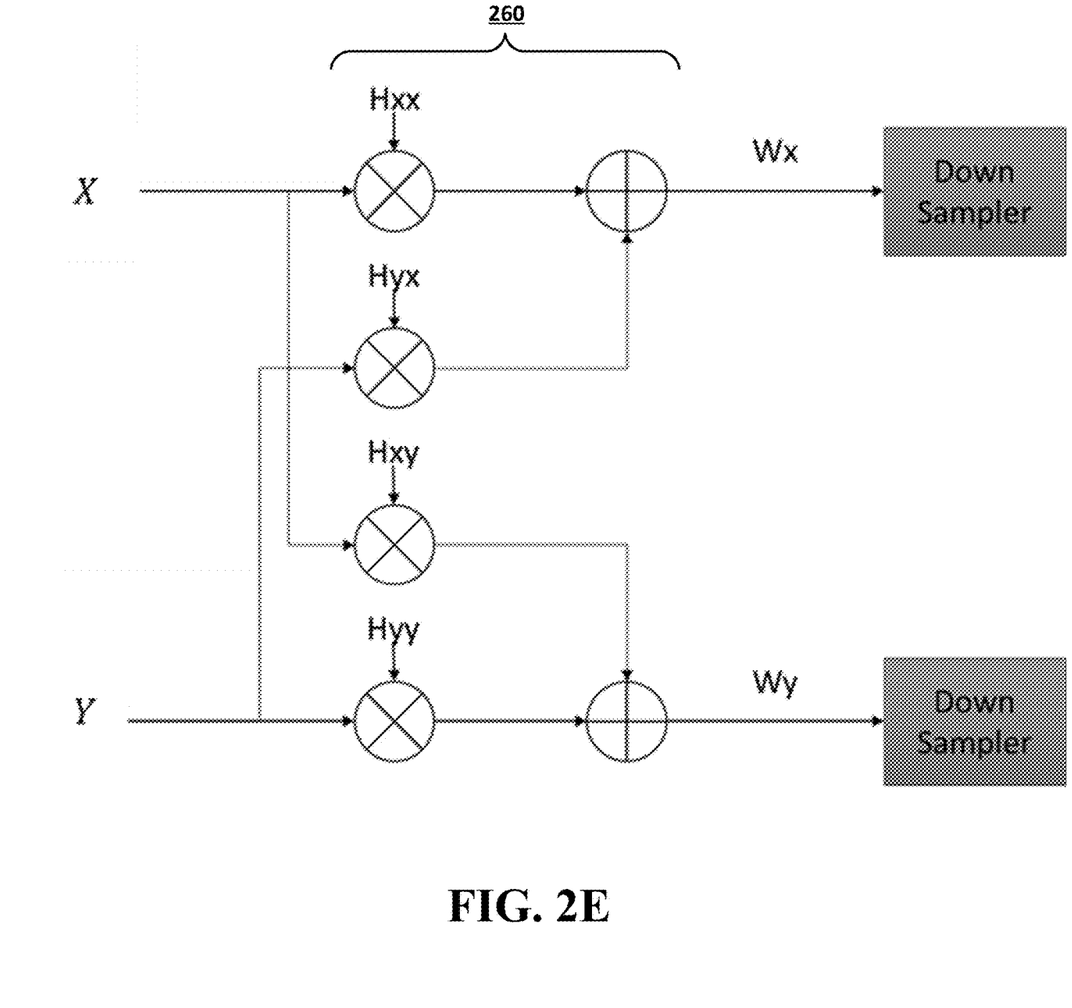
FIG. 2E is a diagram of an example, non-limiting embodiment of a filter for an FDM signal, in accordance with various aspects described herein.

FIG. 2E is a diagram of an example, non-limiting embodiment of an H Filter 260 for an FDM signal, in accordance with various aspects described herein. As shown in FIG. 2E, the H filter 260 may be implemented in a matrix multiplier (e.g., a Jones matrix composed of multipliers and adders). The received signal streams (receive X and receive Y polarizations) corresponding to the FDM signal may be filtered using according to coefficients (Hxx, Hyx, Hxy, Hyy) of the matrix such that the outputs (Wx and Wy) match as closely as possible the transmit X and transmit Y polarizations. In other words, for the FFT bin associated with the FDM signal, the H filter 260 provides a matrix transformation from the receive polarizations (X, Y) to the transmit polarizations (Wx, Wy). Of course, if the signals experience no polarization effects other than polarization rotation, then the coefficients of all of the H filters 260 may be the same across FDM subcarriers. For instance, even in the case of just chromatic dispersion, which affects both polarizations equally, the coefficients of the different H filters 260 may be affected equally. However, transmitted signals usually experience various frequency dependent effects (e.g., frequency mode dispersion, etc.), and thus the coefficients of one H filter 260 may be different from those of another H filter 260, and thus all of the matrices may be different across frequencies.

In any case, by virtue of the above-described overlapping LMS regions, some inputs of "adjacent" H filters 260 may overlap, and duplicate (and generally different) filtering operations may be performed for the overlapping frequencies. That is, by virtue of the overlapping filter regions, the information in expansion regions of neighboring FDM signals may be equalized twice—i.e., by different filters. Separate H filtering, as described above, ensures that supercharger effects associated with one FDM signal would not affect a neighboring FDM signal. Of course, in general, the cost for implementing this separate and overlapping H filtering is that more multiplication operations, and thus more gates, would be required, resulting in greater heat dissipation.

Implementing separate H filtering accommodates for different roll-offs that might be used for the FDM signals (e.g., zero roll-off or a gentler roll-off, such as a raised cosine roll-off). Implementing separate H filtering also accommodates for different dispersion or different delay associated with different FDM signals. This is advantageous since each FDM signal may require different delay equalization (e.g., due to per-FDM chromatic dispersion compensation in the Tx or per-FDM clock recovery). That is, different linear slopes may need to be added to the signal phase as a function of frequency in order to achieve the equivalent of a time shift or delay in the time domain. Using a single supercharger in the equalization of all of the FDM signals may undesirably smooth out or average the various optimizations by the different LMS blocks. Thus, having separate H filters, as described herein, allows each filter to optimize (or approximately optimize) the relevant properties of a given FDM signal, without affecting neighboring FDM signals. In exemplary embodiments, a Wiener optimum matched-filter may be produced separately for each FDM signal.

In one or more embodiments, the equalizations of different FDM signals may be (e.g., substantially) independently controlled. Substantially independent control means that, for a given FDM signal, the information associated with a neighboring FDM signal or other FDM signal(s) has little to no bearing on the control process (i.e., the calculation of the coefficients of the H filter 260) for that FDM signal. For instance, if the energy associated with a neighboring FDM signal or other FDM signal(s) constitutes less than a threshold percentage (e.g., 1 part out of 64 or less or 1 part out of 128 or less) of the total energy relied upon for equalization control of a given FDM, then it may be considered substantially independent control; whereas, any greater reliance on the energy associated with a neighboring FDM signal or other FDM signal(s) may be considered dependent control.

In the example discussed above with respect to FIG. 2C, the (e.g., four) FDM signals may each have the same Baud rate and a rectangular signal spectrum (i.e., where $\rho=0.000$), with no gap between them (or approximately no gap, such as a gap that is less than a peak-to-peak variation in IF). However, non-zero values of $\rho$ and non-root-raised-cosine spectral shapes can alternatively be used. Also, different Baud rates per FDM signal may be used and/or fixed or variable spectral gaps may be placed between FDM signals. Therefore, it will be understood and appreciated that, to support significant variations in the desired FDM Baud rate and/or in the gap between FDM signals, the selected frequency range of each LMS region may be provisioned by firmware or adaptively tracked/determined.

In some embodiments, frequency-domain LMS may be employed to control the filter coefficients for each of 2K FFT bins and achieve high-speed tracking, where K bins may be centered at each of the two edges as X filter zones (i.e., as described in the aforementioned co-pending U.S. patent application Ser. No. 18/193,322, filed on Mar. 30, 2023, regarding the X-filter). Updates of these 2K coefficients would not be significantly suppressed such that sharp frequency-delineation can be achieved simultaneously with fast tracking. As K is much smaller than the size of the FFT, there is generally no significant performance impact from coefficient noise. The methods described herein advantageously operate together with an X-filter, or could be used instead of some or all instances of an X-filter. The methods described herein advantageously operate on all neighboring edges of all of the FDM signals, but could operate on fewer locations.

In some embodiments, LMS for the H filter may include fine frequency granularity (i.e., where frequency finesse is less than a predefined number of FFT bins) for edge-bands of each FDM subcarrier in order to better track the sharp frequency domain roll-offs due to FDM subcarriers that have small roll-off (e.g., roll-off factor of 0.07 or less or 0.01 or less) and small guard-bands. As an example, referring to FIG. 2C, a fine frequency granularity for fast tracking of transitions in the overlap band 250 may be considered for LMS 1 and LMS 2. It should be noted that since the overlap band is a small portion of overall spectrum, the incurred noise in the LMS feedback loop due to tracking fine frequency granularity for such a band should be small.

The above-described embodiments employ LMS for the H filter. However, it will be understood and appreciated that RLS, approximated RLS, constant modulus, or other known equalizer control methods may be used to calculate/control the coefficients of any one FDM equalizer. In some embodiments, a gradient associated with a chosen gradient descent method may be substantially calculated from the corresponding FDM signal. Substantially here means that the energy associated with the FDM signal may constitute a large part (e.g., above a threshold amount, such as 63 parts out of 64 or more or 127 parts out of 128 or more) of the total energy relied upon for the calculation of the gradient.

A frequency domain implementation, after an FFT, is generally desirable and has been used in the examples described herein. However, it will be understood and appreciated that a time domain finite impulse response (FIR), matrix, or other implementations can alternatively be used.

In some examples described herein, a single set of four ADCs may be used to produce equal values of the sampling ratio N for all FDM signals. However, it will be understood and appreciated that other (e.g., more intricate) sampling schemes may vary N across the spectrum.

It is to be understood and appreciated that, although one or more of FIGS. 1 and 2A-2E might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components, devices, systems, modules, circuits, etc. may have been illustrated in one or more of FIGS. 1 and 2A-2E as separate components, devices, systems, modules, circuits, etc., it will be appreciated that multiple components, devices, systems, modules, circuits, etc. can be implemented as a single component, device, system, module, circuit, etc., or a single component, device, system, module, circuit, etc. can be implemented as multiple components, devices, systems, modules, circuits, etc. Additionally, functions described as being performed by one component, device, system, module, circuit, etc. may be performed by multiple components, devices, systems, modules, circuits, etc., or functions described as being performed by multiple components, devices, systems, modules, circuits, etc. may be performed by a single component, device, system, module, circuit, etc.

Figure 3:
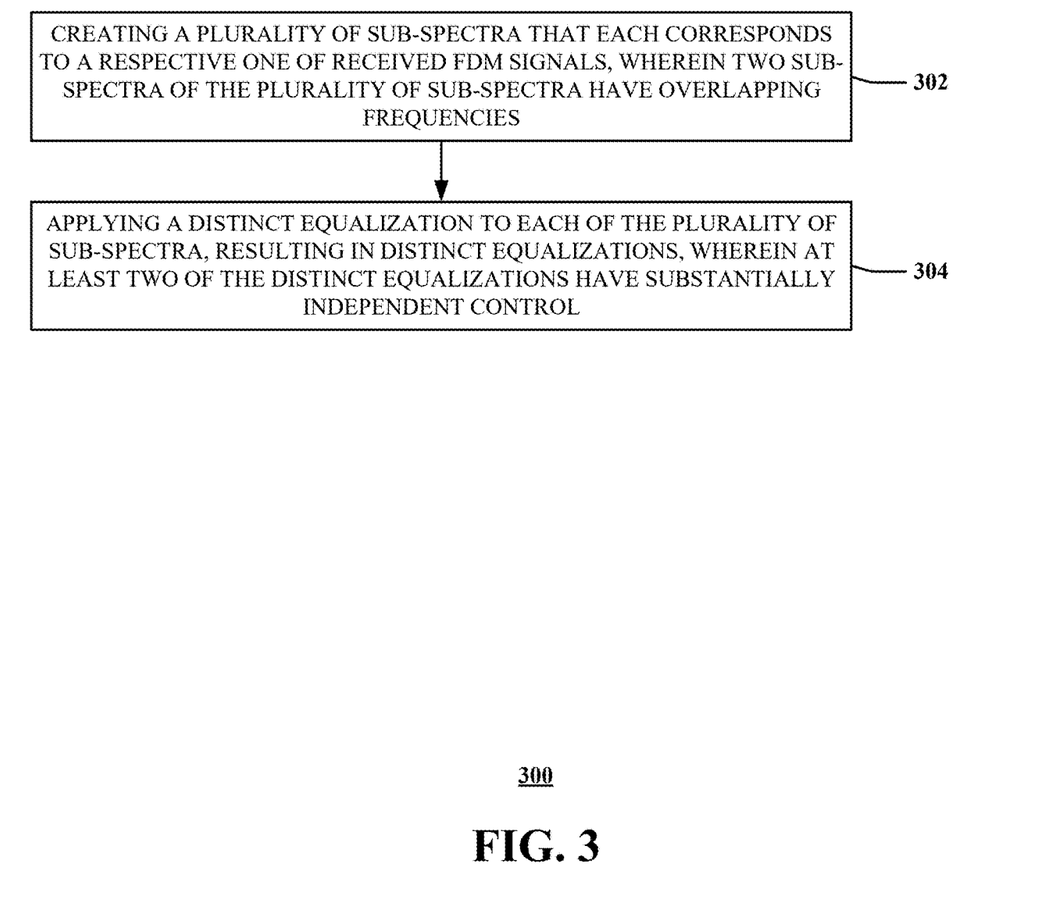
FIG. 3 depicts an illustrative embodiment of a method in accordance with various aspects described herein.

FIG. 3 depicts an illustrative embodiment of a method 300 in accordance with various aspects described herein.

At 302, the method can include creating a plurality of sub-spectra that each corresponds to a respective one of received FDM signals, wherein two sub-spectra of the plurality of sub-spectra have overlapping frequencies. For example, a coherent receiver device may, similar to that described elsewhere herein, perform one or more operations that include creating a plurality of sub-spectra that each corresponds to a respective one of received FDM signals, wherein two sub-spectra of the plurality of sub-spectra have overlapping frequencies.

At 304, the method can include applying a distinct equalization to each of the plurality of sub-spectra, resulting in distinct equalizations, wherein at least two of the distinct equalizations have substantially independent control. For example, a coherent receiver device may, similar to that described elsewhere herein, perform one or more operations that include applying a distinct equalization to each of the plurality of sub-spectra, resulting in distinct equalizations, wherein at least two of the distinct equalizations have substantially independent control.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

One or more aspects of the subject disclosure include a device, comprising a coherent optical receiver system configured to receive Frequency Division Multiplexed (FDM) signals within a spectrum, and a filter system configured to equalize the FDM signals. The filter system may be configured to create a plurality of sub-spectra that each corresponds to (e.g., an anticipated spectral range of) a respective one of the FDM signals, wherein two sub-spectra of the plurality of sub-spectra have overlapping frequencies. The filter system may also be configured to apply a distinct equalization to each of the plurality of sub-spectra, resulting in distinct equalizations, wherein at least two of the distinct equalizations have substantially independent control.

One or more aspects of the subject disclosure include a non-transitory machine-readable medium, comprising executable instructions that, when executed by a processing system including a processor, facilitate performance of operations. The operations may include receiving, at a coherent optical receiver system, Frequency Division Multiplexed (FDM) signals within a spectrum, and equalizing the FDM signals. The equalizing may involve creating a plurality of sub-spectra that each corresponds to a respective one of the FDM signals, wherein two sub-spectra of the plurality of sub-spectra have overlapping frequencies. The equalizing may also involve applying a distinct equalization to each of the plurality of sub-spectra, resulting in distinct equalizations, wherein at least two of the distinct equalizations have substantially independent control.

One or more aspects of the subject disclosure include a method. The method may include receiving, at a coherent optical receiver system, Frequency Division Multiplexed (FDM) signals within a spectrum, and equalizing the FDM signals. The equalizing may involve creating a plurality of sub-spectra that each corresponds to a respective one of the FDM signals, wherein two sub-spectra of the plurality of sub-spectra have overlapping frequencies. The equalizing may also involve applying a distinct equalization to each of the plurality of sub-spectra, resulting in distinct equalizations, wherein at least two of the distinct equalizations have substantially independent control.

The terms "first," "second," "third," and so forth, as may be used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. As yet another example, a component can be an apparatus that provides specific functionality through electronic components without mechanical parts, the electronic components can comprise a processor therein to execute software or firmware that confers at least in part the functionality of the electronic components.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:
1. A device, comprising:
 a coherent optical receiver system configured to receive Frequency Division Multiplexed (FDM) signals within a spectrum; and
 a filter system configured to equalize the FDM signals, wherein the filter system is configured to:

create a plurality of sub-spectra that each corresponds to a respective one of the FDM signals, wherein two sub-spectra of the plurality of sub-spectra have overlapping frequencies; and apply a distinct equalization to each of the plurality of sub-spectra, resulting in distinct equalizations, wherein at least two of the distinct equalizations have substantially independent control.

2. The device of claim 1, wherein a width of overlap of the overlapping frequencies corresponds to a width of a down-sampling expansion region for an FDM signal.

3. The device of claim 1, wherein a width of overlap of the overlapping frequencies is approximately equal to (N−1)/2*a Baud rate of an FDM signal, and wherein 1<N<2.

4. The device of claim 1, wherein a roll-off factor of at least one of the FDM signals is less than 0.07 or 0.01.

5. The device of claim 1, wherein the distinct equalization applied to each of the two sub-spectra provides fine frequency granularity of a predefined frequency finesse for an equalization response within the overlapping frequencies.

6. The device of claim 1, wherein a frequency gap between two of the FDM signals is approximately zero.

7. The device of claim 1, wherein a frequency gap between neighboring FDM signals is less than a peak-to-peak laser frequency deviation.

8. The device of claim 1, wherein at least one of the distinct equalizations is controlled by a gradient descent method.

9. The device of claim 8, wherein a gradient associated with the gradient descent method that controls a particular distinct equalization of a particular sub-spectra is substantially calculated from an FDM signal that corresponds to that particular sub-spectra.

10. The device of claim 8, wherein the gradient descent method is configured to track, with fine frequency granularity of a predefined frequency finesse, any frequency transition within the overlapping frequencies that has a roll-off factor less than a predefined value.

11. The device of claim 1, wherein control of each of at least one of the distinct equalizations involves use of a respective method for reducing filter coefficient noise.

12. The device of claim 1, wherein a spectral range of at least one of the plurality of sub-spectra is provisioned or adaptively selected.

13. The device of claim 1, wherein Baud rates of at least two of the FDM signals are equal.

14. The device of claim 1, wherein roll-off factors of at least two of the FDM signals are equal.

15. The device of claim 1, wherein widths of at least two of the plurality of sub-spectra are equal.

16. A non-transitory machine-readable medium, comprising executable instructions that, when executed by a processing system including a processor, facilitate performance of operations, the operations comprising:

receiving, at a coherent optical receiver system, Frequency Division Multiplexed (FDM) signals within a spectrum; and equalizing the FDM signals, wherein the equalizing involves:

creating a plurality of sub-spectra that each corresponds to a respective one of the FDM signals, wherein two sub-spectra of the plurality of sub-spectra have overlapping frequencies; and applying a distinct equalization to each of the plurality of sub-spectra, resulting in distinct equalizations, wherein at least two of the distinct equalizations have substantially independent control.

17. The non-transitory machine-readable medium of claim 16, wherein a width of overlap of the overlapping frequencies corresponds to a width of a down-sampling expansion region for an FDM signal.

18. The non-transitory machine-readable medium of claim 16, wherein a width of overlap of the overlapping frequencies is approximately equal to (N−1)/2*a Baud rate of an FDM signal, and wherein 1<N<2.

19. A method, comprising:

receiving, at a coherent optical receiver system, Frequency Division Multiplexed (FDM) signals within a spectrum; and equalizing the FDM signals, wherein the equalizing involves:

creating a plurality of sub-spectra that each corresponds to a respective one of the FDM signals, wherein two sub-spectra of the plurality of sub-spectra have overlapping frequencies; and applying a distinct equalization to each of the plurality of sub-spectra, resulting in distinct equalizations, wherein at least two of the distinct equalizations have substantially independent control.

20. The method of claim 19, wherein a width of overlap of the overlapping frequencies corresponds to a width of a down-sampling expansion region for an FDM signal.

* * * * *